(No Model.)

2 Sheets—Sheet 1.

L. N. BYAR.
WINDOW GRATING.

No. 284,117.

Patented Aug. 28, 1883.

WITNESSES:
James F. Tobin
Harry L. Ashenfelter.

INVENTOR:
Lewis N. Byar
by his Attorneys
Howson & Sons (No Model.) 2 Sheets—Sheet 2.

L. N. BYAR.
WINDOW GRATING.

No. 284,117. Patented Aug. 28, 1883.

WITNESSES:
James F. Tobin
Harry L. Ashenfelter.

INVENTOR:
Lewis N. Byar
by his Attys
Howson & Sons

UNITED STATES PATENT OFFICE.

LEWIS N. BYAR, OF POTTSTOWN, PENNSYLVANIA.

WINDOW-GRATING.

SPECIFICATION forming part of Letters Patent No. 284,117, dated August 28, 1883.

Application filed June 19, 1883. (No model.)

*To all whom it may concern:*

Be it known that I, LEWIS N. BYAR, a citizen of the United States, and a resident of Pottstown, Montgomery county, Pennsylvania, have invented certain Improvements in Window-Gratings, of which the following is a specification.

My invention relates to an improvement in that class of gratings which are used for cellar-windows, the main object of my invention being to combine an inner door or screen with the outer frame and grating without the necessity of employing the usual wooden frame, and a further object being the general improvement of screens or gratings of this class.

Figure 1:
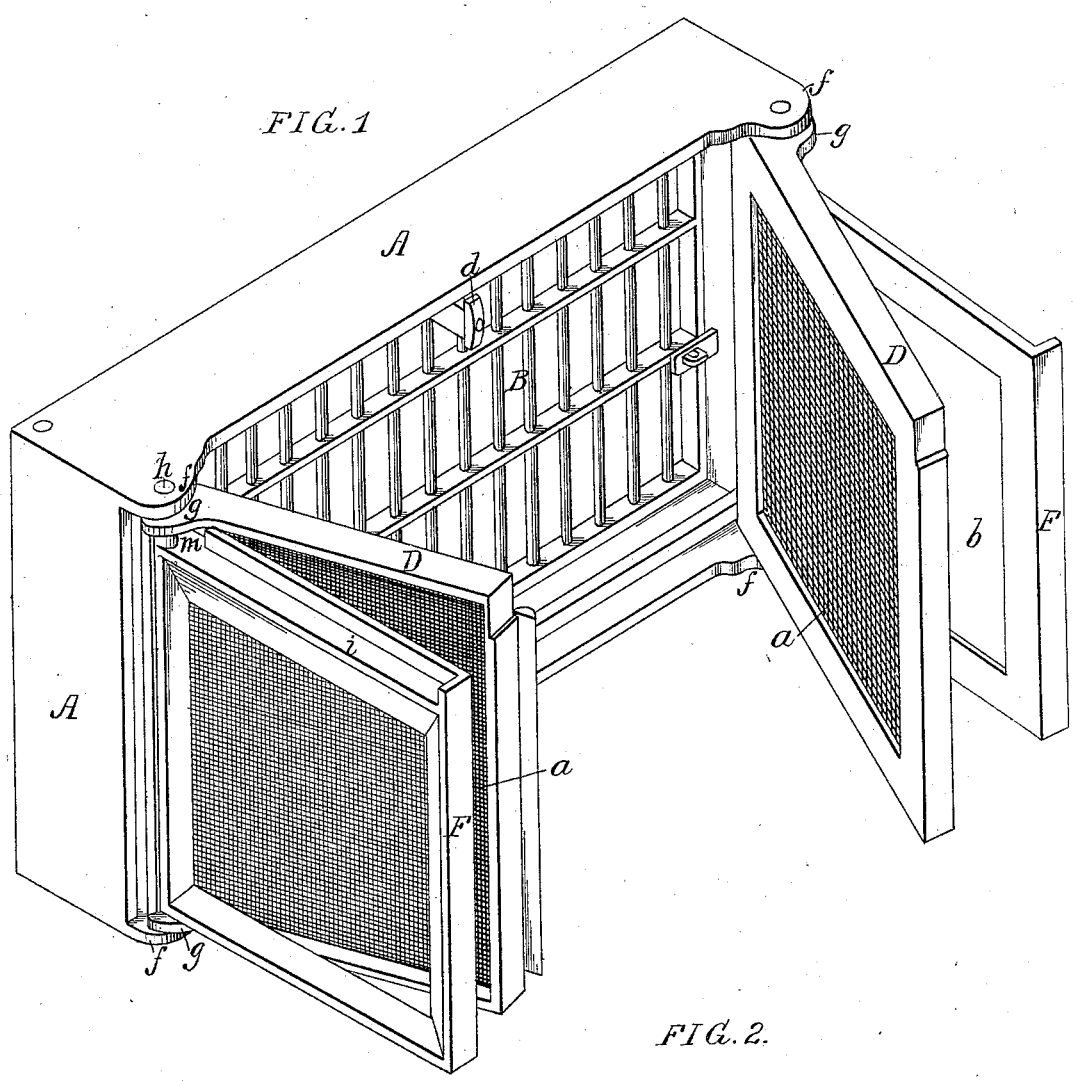
Figure 2:
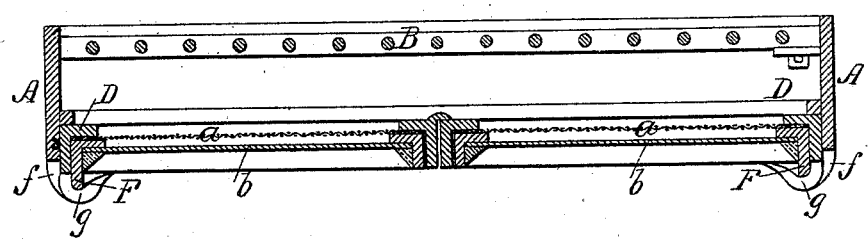
Figure 3:
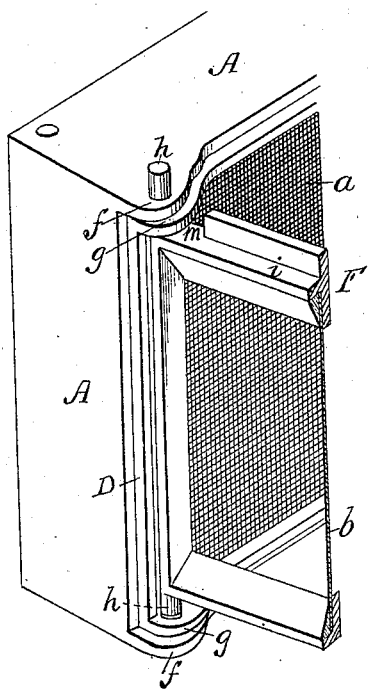
Figure 4:
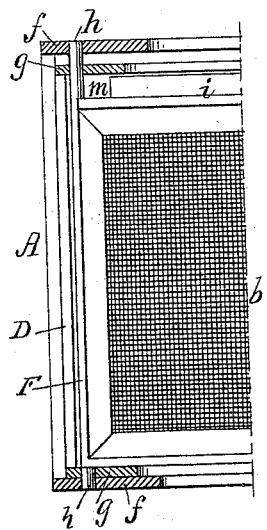

In the accompanying drawings, Figure 1, Sheet 1, is a perspective view of my improved window-grating; Fig. 2, a sectional plan view of the same, with the grating, screen, and glazed frame closed; Fig. 3, Sheet 2, a perspective view of one corner of the structure, showing the method of applying the glazed frame and screen to or removing them from the outer frame; and Fig. 4, a face view, partly in section, of the end of the frame.

A represents the outer frame of the structure, which is built into the brick-work of the wall, so as to inclose the window-opening, as usual, and is provided with the ordinary hinged front grating, B.

To the inside of the frame A, at each end of the same, are pivoted frames D and F, the former being provided with screens $a$, and the frames F with panes $b$, of glass, said frames F fitting inside the frames D, as shown in Fig. 2, for the sake of compactness, and a single turn-buckle, $d$, on the frame A serving to confine either or both of the frames D and F when the latter are closed. By this means the window-opening may be tightly closed by the glazed frames F, or upon opening said frames proper ventilation through the screens $a$ is effected without permitting the entrance of insects, a still freer flow of air being permitted upon opening the frames D.

In hanging the frames D and F the usual outer wooden frames are dispensed with, and said frames D and F are hung directly to the frame A, as follows: On said frame A are formed ears $f$, and on each of the screen-frames D are ears $g$, openings being made in both sets of ears. On each of the frames F are pins $h$, the upper pin being somewhat longer than the lower one, and the upper bar, $i$, of each frame F has a recess, $m$, formed therein adjacent to the pin. In fitting the parts together one of the frames D is first adjusted to the frame A, the openings in the lugs or ears $f$ and $g$ being in line with each other. The upper pin $h$ of one of the frames F is then passed through the openings in the ears $f$ and $g$ to the full extent permitted by the recess $m$, as shown in Fig. 3. This allows the lower pin $h$ to be swung into position over the openings in the lower ears, so that on depressing the frame F said lower pin enters the openings, and the pivoting of both frames D and F to the frame A is effected, as shown in Fig. 1. The opposite frames, D and F, are hung to the frame A in the same manner.

Instead of using double frames pivoted at the outer ends and meeting in the center, as shown, each of the frames D and F may be single, like the grating B, the same method of pivoting the frames, however, being adopted.

In order to effect the attachment of the screens to the frames D, I prefer to provide said frames with pins, which pass through the meshes of the screens and are then bent down or flattened in order to retain said screens.

I claim as my invention—

1. The combination of the outer grating and its frame A with inner frames, D and F, the former carrying a screen, and the frame F being glazed, as set forth.

2. The combination of the frame A, the frame D, and the frame F, having pins $h$, adapted to openings in the frames A and D, and serving to pivot both frames D and F to said frame A, as set forth.

In testimony whereof I have signed my name to this specification in the presence of two subscribing witnesses.

LEWIS N. BYAR.

Witnesses:
HARRY L. ASHENFELTER,
HENRY HOWSON, Jr.